United States Patent [19]
Halko et al.

[11] Patent Number: 6,102,521
[45] Date of Patent: *Aug. 15, 2000

[54] TREATMENT OF AN ORIFICE PLATE WITH SELF-ASSEMBLED MONOLAYERS

[75] Inventors: David J. Halko; Barbara Tomlonovic Halko, both of Corvallis, Oreg.

[73] Assignee: Hewlett-Packard Company, Palo Alto, Calif.

[ * ] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/790,744

[22] Filed: Jan. 27, 1997

Related U.S. Application Data

[63] Continuation of application No. 08/410,624, Mar. 24, 1995, Pat. No. 5,598,193.

[51] Int. Cl.[7] ........................................... B41J 2/14
[52] U.S. Cl. .................................................. 347/47
[58] Field of Search ........................................ 347/45, 47

[56] References Cited

U.S. PATENT DOCUMENTS

| | | |
|---|---|---|
| 4,539,061 | 9/1985 | Sagiv . |
| 5,598,193 | 1/1997 | Halko et al. ................................ 347/45 |

FOREIGN PATENT DOCUMENTS

| | | |
|---|---|---|
| 5-116324 | 5/1993 | Japan . |

OTHER PUBLICATIONS

Synthesis, Structure, And Properties of Model Organic Surfaces, Dubois, et al., Annu. Rev. Phys. Chem., 1992, vol. 43, pp. 437–463.

*Primary Examiner*—John Barlow
*Assistant Examiner*—Charles W. Stewart, Jr.

[57] ABSTRACT

Treatment of the inner and outer surfaces of an orifice plate for ink-jet pens with self-assembled monolayers is disclosed. The outer surface of a gold-plated orifice plate is treated with self-assembled monolayers to control wettability of the surface in order to reduce the accumulation of residual ink. The inner surface is treated with self-assembled monolayers to improve and control drop ejection. Various monolayers can also be used on the inner surface allowing for greater flexibility in controlling the steady state firing rate and uniformity of drops from a pen. In addition, treatment of orifice plate surfaces with self-assembled monolayers inhibits corrosion and contamination of the plate while presenting a uniform surface for the ink. The self-assembled monolayers for use in the present invention include thiols, disulfides, and sulfinates, having terminal functional groups which determine the wettability of the surface. A chemical bond is formed between the gold on the orifice plate and the thiol, disulfide, or sulfinate group of the monolayer compounds. The terminal functional group of the monolayer compound is therefore oriented away from the surface of the orifice plate and renders the surface either wetting or nonwetting depending on whether the term group has hydrophobic or hydrophilic characteristics.

12 Claims, 2 Drawing Sheets

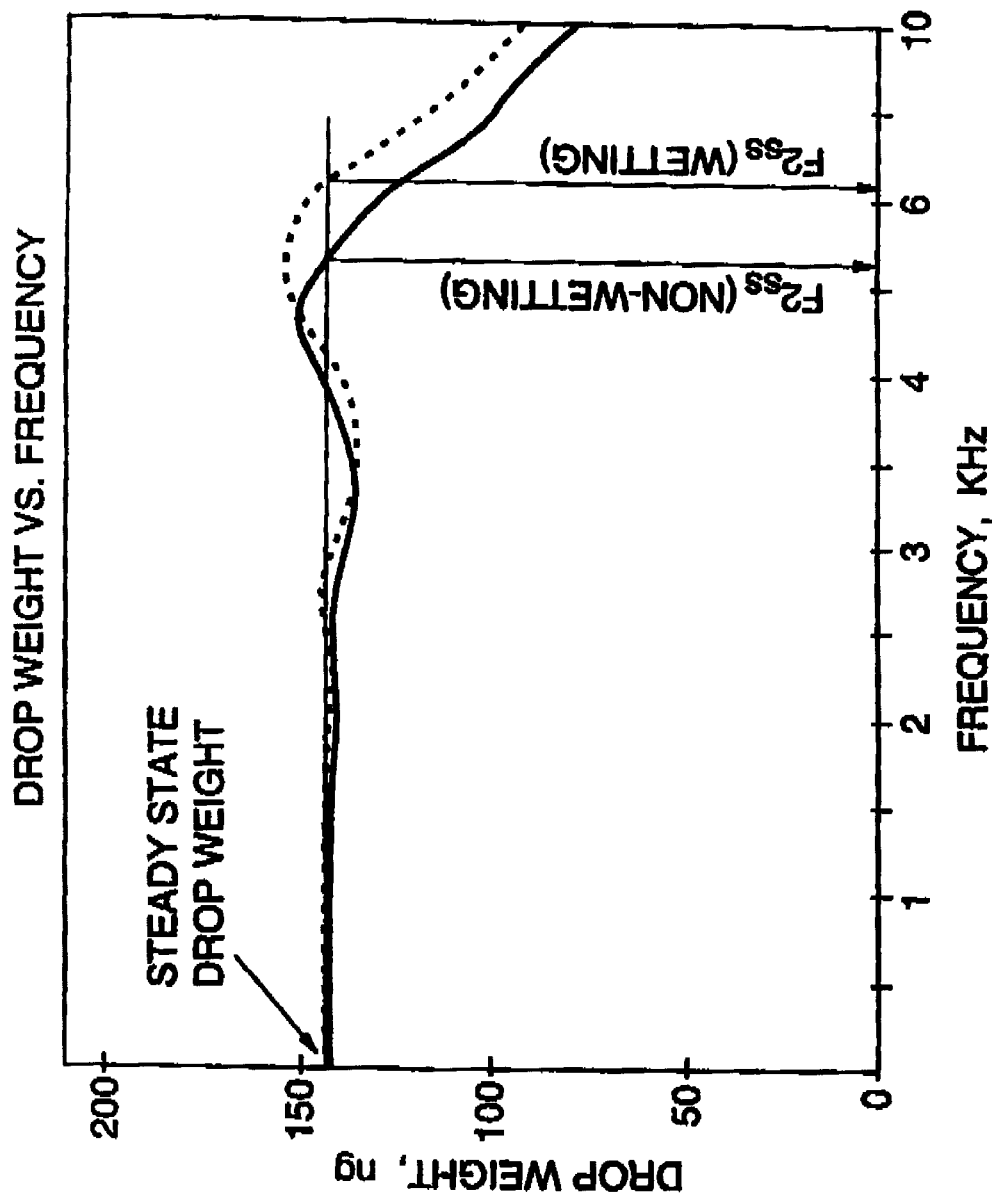

2

TREATMENT OF AN ORIFICE PLATE WITH SELF-ASSEMBLED MONOLAYERS

This application is a continuation of Ser. No. 08/410,624 Mar. 24, 1995 U.S. Pat. No. 5,598,193.

TECHNICAL FIELD

This invention pertains to treating an orifice plate used in ink-jet pens with chemical compounds which form self-assembled monolayers on the surfaces of the orifice plate.

BACKGROUND OF THE INVENTION

Whenever an ink drop is ejected from an orifice of an orifice plate, a trailing portion or "tail" of ink moves with the drop. A small amount of the ink tail may separate and land on the outer surface of the plate as an ink droplet. Residual ink that collects on the orifice plate outer surface near the edges of the orifices may contact subsequently ejected ink drops, thereby altering the trajectory of those drops, which reduces the quality of the printed image.

Also, in the event that a substantial amount of residual ink accumulates on the orifice plate outer surface, a continuous liquid path between the ink within the orifice and the ink on the outer surface may be formed, thereby facilitating leakage of the ink out of the orifice. Further, when a substantial amount of ink accumulates on an orifice plate, this large pool of ink can interfere with drop ejection to the extent that no drops are ejected, i.e. a single drop is unable to pass through the large pool of ink. Moreover, the residual ink on the outer surface of the plate tends to trap minute particles, such as paper fibers, thereby interfering with the trajectory of subsequently-ejected drops.

The inner surface of the orifice plate is in contact with ink and modifying the surface energy of this portion of the plate is an advantage to optimize the performance of the pen, i.e. fine tuning the characteristics of the ink drops as they are ejected from an orifice.

As discussed in more detail in prior application (Ser. No. 07/724,648, filed Jul. 21, 1991, European Patent Application No. 0 521 697 A2), it has been found that the wetting characteristics of certain portions of the outer surface of an orifice plate can be made to enhance pen performance. More specifically, that application describes various techniques to make the outer surface of the orifice plate immediately surrounding the orifices nonwetting with respect to the ink. As a result, it was found that any residual ink deposited on the outer surface of the plate in those regions would bead up away from the edges of the orifices so as not to interfere with the subsequent ejection of ink drops. The remaining portion of the outer surface of the orifice plate is made wetting with respect to the ink such that any residual ink which comes into contact with this portion will flow off the plate under the influence of gravity, or by wipers. Further, as also described in that application the inside surface of the plate can be treated to be a wetting surface with respect to the ink in order to facilitate the flow of ink into and through the orifices.

As described in the referenced application, the orifice plate was made wetting or nonwetting by techniques such as plasma etching or reactive ion etching. Alternatively, a nonwetting surface could be made by a spray-application of a cross-linked silicone resin, such as methyltrimethoxy silane manufactured by Dow Corning and designated QI-2645. The nonwetting characteristics of the orifice plate surface, as described in the referenced patent application, could be made nonwetting by the application of a fluorocarbon or silicon polymer layer via a conventional plasma polymerization technique.

While these techniques are more than satisfactory for overcoming the problems associated with ink-jet pen performance identified in that application, the present invention provides an orifice plate (and methods for making the same) having significant differences in the chemistry of its makeup, its construction, and the manner by which it functions to affect the overall printing quality and performance of the pen.

More specifically, the present invention is directed to the chemisorption or chemical bonding of certain compounds, such as thiols, to form self-assembled monolayers on the orifice plate. Self-assembly is the spontaneous adsorption of thiols or other compounds on a solid surface from solution or other direct molecular contact which results in a monolayer of oriented molecules on the metal surface. For example, for an alkyl thiol $HS(CH_2)_nX$, the sulfur is bonded to the gold and the terminal group X is at the surface of the monolayer, i.e. monolayer/air interface. The terminal functional group X renders the orifice plate either wetting or nonwetting depending on the terminal group selected. The present invention is also advantageous in that the monolayers are easily applied in a relatively short period of time.

Further, the present invention provides an orifice plate having an inner surface treated with a self-assembled monolayer as mentioned above. It has been found that treating the inner surface with a monolayer of certain compounds affects the rate at which the firing chamber refills after a drop is ejected. In particular, by treating the inner surface with a self-assembled monolayer, it is possible to obtain a constant or steady state ink drop weight at a specific frequency, or the rate at which the ink drops are fired. As should be appreciated, a constant ink drop weight is critical to the overall printing quality and performance of the ink-jet pen. In addition, obtaining a constant ink drop weight at a specific or higher frequency allows for greater control over the performance of the pen. Importantly, it has been discovered that such results can be obtained by using either wetting or nonwetting monolayers on the inner surface of the orifice plate.

In addition, treating an orifice plate with a monolayer inhibits deterioration and contamination of the orifice plate. Consequently, better printing quality over the life of a pen is achieved.

SUMMARY OF THE INVENTION

This invention is directed to treating an orifice plate for an ink-jet pen with compounds which form self-assembled monolayers which determine the surface properties of the plate. The orifice plate has an outer surface treated with self-assembled monolayers for effectively minimizing the build-up of any residual ink, which may otherwise interfere with subsequent ink-drop ejection or reduce the printing quality of the pen.

In one embodiment, the outer surface is treated with a self-assembled monolayer having nonwetting characteristics so that any residual ink thereon will bead up and be readily removed.

In another aspect, the annular portion around the orfice is made nonwetting with a self-assembled monolayer, and the portion of the plate surrounding the annular portion is made wetting with another self-assembled monolayer. In this configuration, any residual ink on the annular nonwetting portion will bead up away from the orifice, and any such ink which contacts the wetting portion will be drawn away from the orifice and removed.

In another aspect of the invention, the inner surface is treated with self-assembled monolayers to control the wetting characteristics, and hence drop ejection and firing frequency of the ink-jet pen. Various wetting or nonwetting self-assembled monolayers can be used on the inner surface to obtain a specific firing frequency. This allows for greater flexibility in the design of the ink-jet pen's performance, and hence, better printing quality and performance.

The present invention also provides for treating an orifice plate with self-assembled monolayers to inhibit corrosion of the orifice plate. As a result, significant improvement in the printing quality over the life of the ink-jet pen is achieved.

Other features and aspects of the invention are provided for and disclosed herein.

BRIEF DESCRIPTION OF THE DRAWINGS

FIG. 1 is a diagram showing a side cross-sectional view of a portion of an orifice plate that is formed in accordance with the present invention.

FIG. 2 is a top plan view of an orifice plate showing the outer surface thereof.

FIG. 3 is a graph of the ink drop weight versus the firing frequency of an ink-jet pen having certain monolayers on the inner surface of the orifice plate.

DETAILED DESCRIPTION OF THE PREFERRED EMBODIMENTS

Figures 1, 2:
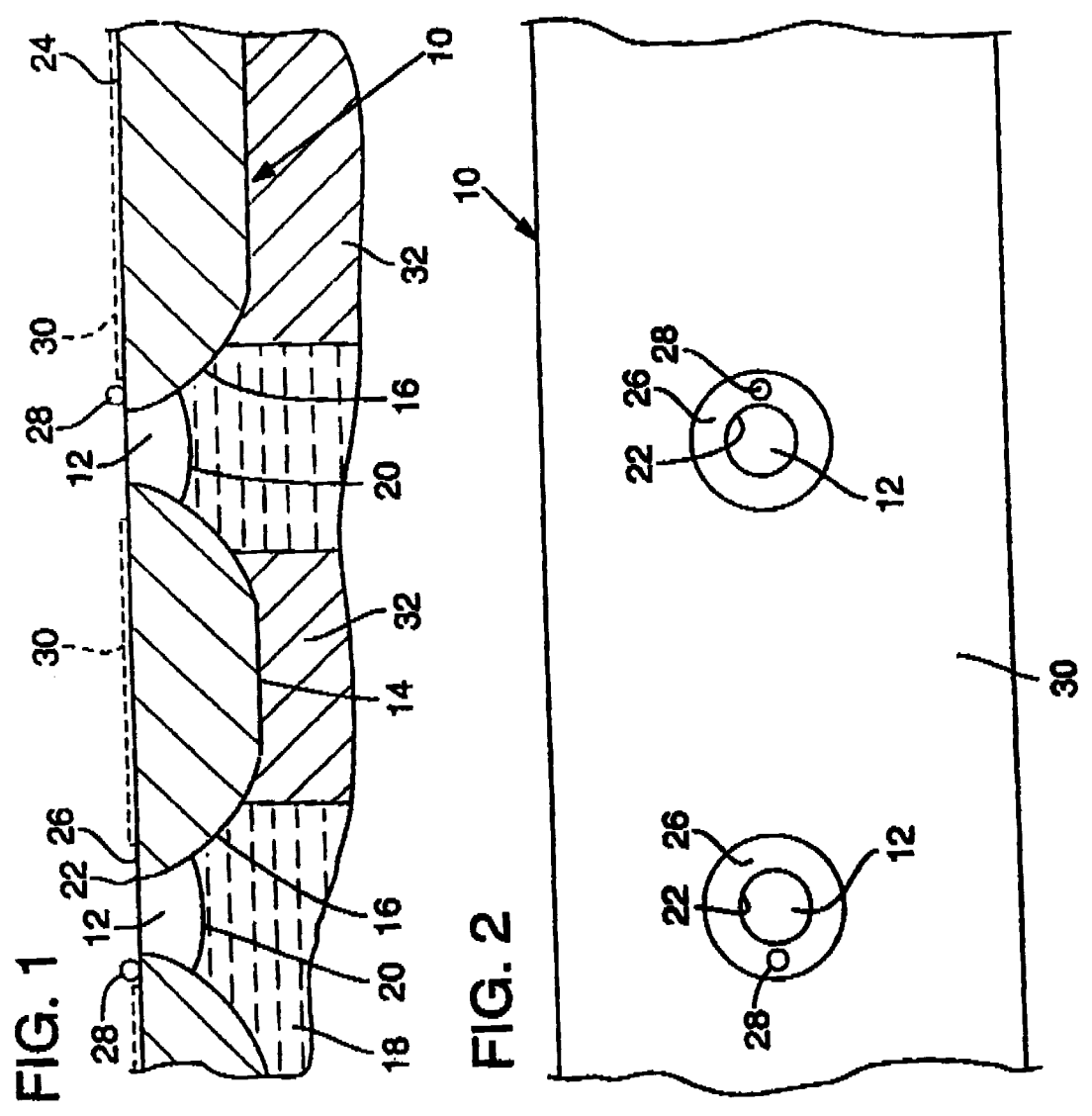

As shown in FIGS. 1–2, the present invention includes an orifice plate 10 for a conventional ink-jet pen. The orifice plate 10 is preferably a sheet of gold-plated nickel constructed by conventional electroforming techniques. It should be appreciated that other metals besides nickel may be used to form the underlying sheet of the orifice plate. Further, other metals, such as palladium, silver, and copper, may be used to plate the underlying sheet. The plate includes an array of orifices 12 through which ink drops are selectively propelled by known ejection means, such as provided by a thermal type ejection system. The plate inner surface 14 includes somewhat funnel-shaped portions 16 that define each orifice.

Ink 18 is drawn by capillary force along the inner surfaces 14 and 16 of the plate 10 into each orifice 12. A partial vacuum or back pressure within the ink-jet pen keeps the ink from passing completely through the orifice 12 in the absence of an ejecting force. Whenever drops of ink are not being fired through the orifice, the ink resides within the orifice with a meniscus 20 just inside the outer edge 22 of the orifice.

The drop ejection system (not shown) is associated with each orifice 12 for selectively ejecting drops of ink through the orifice to a printing medium, such as paper. The orifices have been shown as generally funnel-shaped in section. It is understood, however, that the orifices may have any one of a variety of shapes.

The surface may be characterized with two extremes as "wetting" or "nonwetting." Further, there is also a range of wetting properties between these extremes. Nonwetting means that the surface energy of the surface is much less than that of the liquid (e.g., ink) that is in contact with the surface. A surface is considered nonwetting if the contact angle between the ink and the surface is large, in this case approximately 70° a or larger. Ink tends to bead on nonwetting surfaces. A wetting surface (with respect to the ink) has a contact angle much less than 70°, or more particularly, about 20° or less. Ink tends to spread across wetting surfaces. However, it should be appreciated that a wide range of wetting conditions can be achieved with the use of monolayer treatments.

The outer surface 24 of the orifice plate 10 has self-assembled monolayers (as discussed below) thereon for affecting its wetting characteristics with respect to the ink. The monolayers may be composed of various treatments or compounds, such as thiols, disulfides or sulfinates, or polymers having thiol, disulfide, or sulfinate groups.

Preferably, the entire surface of the orifice plate (annular area 26 and surrounding area 30) is made nonwetting. For instance, the orifice plate can be immersed or sprayed with an ethanol solution, containing 1–10 mM of the particular thiol compound selected to form the monolayer. With this condition, any residual ink on the surface will tend to bead up and be easily removed with a wiper, vacuum or any other servicing technique. Further, the wiper (not shown) is preferably made wetting with respect to the residual ink so that the ink will rapidly transfer from the orifice plate to the wiper.

Alternatively, the annular area 26 or portion surrounding each orifice 12 of the orifice plate 10 is made nonwetting with respect to the ink. Hence, any residual ink on this area will bead up 28 away from the edge 22 of the orifice so as not to interfere with the subsequent ejection of ink drops. Further, the contamination of the surface with paper fibers or other substances will be minimized, thereby allowing for improved ejection of ink drops.

The remaining area of the plate 30 (or the portion surrounding the annular areas as shown by the dotted line in FIG. 1) in this case is made wetting with respect to the ink. In this manner, any residual ink which comes into contact with this wetting area will flow away from the orifices 12 and eventually off the plate (or can be wiped from the plate by the use of a wiper).

Various techniques can be utilized to apply the desired monolayer to the selected areas of the orifice plate 10. For instance, the orifice plate can be immersed in a solution containing the monolayer. The chemical bonding of the monolayer to the gold-plated surface occurs rapidly. Alternatively, if different monolayers are to be applied to each side of the orifice plate, or if only one side is to be treated, the solution containing the monolayer can be sprayed onto the appropriate side of the plate. Further, the monolayer may be applied to the plate with the use of a stamp or pad absorbed with the solution. In any case, the application of the monolayer compounds in accordance with the present invention can be quickly accomplished and is cost efficient compared to other known methods of altering the wetting characteristics of surfaces.

More specifically, to treat the outer surface 24 of the orifice plate 10 with monolayers as shown in FIG. 2, a photoresist mask is first applied by known techniques to the area 26 which is to be made nonwetting. A wetting monolayer is then applied to the outer surface of the plate by using one of the techniques as discussed above. The photoresist is then removed from the plate. The plate is then treated with a nonwetting monolayer by either dipping it in or spraying it with a solution of nonwetting monolayer. Thus, the plate will have a nonwetting monolayer in the annular regions 26 surrounding the orifices, and a wetting monolayer in the remaining area 30. It should be appreciated that other methods can be used to apply the wetting and nonwetting monolayers to the selected areas of the orifice plate.

As shown in Table 1 below, a wide range of wettability of the orifice plate 10 can be achieved depending on the particular compounds used for the monolayers. It has generally been found that the order or magnitude of the contact angle of the ink (or water) with the orifice plate is consistent with the chemical structure of the monolayer compound. This table illustrates the wetting characteristics of gold-plated orifice sheets treated with a range of thiols having various terminal functional groups. (The wetting characteristics were determined by measuring the contact angles of water and ink with the treated orifice plates.)

TABLE 1

| Monolayer Molecule | Compound Number | Atomic Chain Length | Contact Angle (Degrees) Water | Contact Angle (Degrees) Ink |
|---|---|---|---|---|
| 1,1,2,2-tetrahydroperfluoro-1-dodecanethiol $HS(CH_2)_2(CF_2)_9CF_3$ | 1 | 12 | 110 | 79 |
| 1-octadecanethiol $HS(CH_2)_{17}CH_3$ | 2 | 18 | 99 | 76 |
| 1-hexadecanethiol $HS(CH_2)_{15}CH_3$ | 3 | 16 | 101 | 74 |
| 11-(2-(2-(2-methoxyethoxy)ethoxy)-ethoxy)undecanethiol $HS(CH_2)_{11}O(CH_2CH_2O)_3CH_3$ | 4 | 22 | 45 | 14 |
| 11-mercapto-1-undecanol $HS(CH_2)_{11}OH$ | 5 | 11 | 39 | 22 |
| L-cystecine ethyl ester $HSCH_2CH(NH_2)CO_2C_2H_5$ | 6 | 3 | 48 | 28 |
| L-cysteine $HSCH_2CH(NH_2)CO_2H$ | 7 | 3 | 22 | 13 |
| 3-mercapto-2-hydroxypropanol $HSCH_2CH(OH)CH_2OH$ | 8 | 3 | 32 | 18 |
| sodium 2,3-dimercapto-1-propanesulfonate $HSCH_2CH(SH)CH_2SO_3Na$ | 9 | 3 | 17 | <5 |
| None | | | 62 | 35 |

Generally, as shown in Table 1, the compounds containing nonpolar terminal groups (or compounds 1–3) are nonwetting, while the compounds containing the more polar groups (or compounds 4–9) are wetting (with compound 9 being the most wetting). The above table also illustrates that compounds with a range of atomic chain lengths can be used to treat orifice plates in this regard. The atomic chain length is the number of atoms from the sulfur atom to the terminal functional group of the molecule. The chain length for the examples shown ranges from 3 to 22 atoms. Longer chain lengths could also be used, as well as larger molecules including polymers with thiol groups for chemically bonding to the gold-surface of the plate.

Chemical compounds which will be effective as self-assembled monolayers are not limited to the examples provided herein. A thiol, disulfide or sulfinate which is either polar or nonpolar, or a polymer having a thiol, disulfide, or sulfinate group could be used. Suitable nonpolar compounds can be aliphatic or aromatic hydrocarbons or a fluorocarbon (such as compounds 1–3 above). Suitable polar compounds can be either an aliphatic or aromatic compound containing almost any of the functional groups known for organic compounds. These functional groups can contain oxygen, as carboxylic acids (compound 7 above), esters (compound 6 above), alcohols (compounds 5 and 8 above), or ethers (compound 4 above). Alternatively, the functional groups can contain sulfur, as sulfonic acids or their salts (compound 9 above) or esters, or sulfates or their esters. The functional groups can contain nitrogen (such as compounds 6 and 7 above) or phosphorus. Finally, the compounds can be either ionic (compound 9 above) or nonionic (compounds 1–8 above). For the types of compounds listed above, the sulfur atom (opposite or away from the terminal function group) covalently bonds with gold when it comes into contact with the gold-plated orifice. The terminal functional group therefore is oriented away from the surface, and hence, affects the wetting characteristics of the surface. It should thus be appreciated that the molecules of the monolayer compound orient themselves in a highly ordered densely-packed monolayer fashion when brought into contact with a gold surface, with the terminal functional groups extending away from the surface to which the molecules bond.

Accordingly, the surface of the orifice plate can be made wetting, nonwetting, or an intermediate wetting characteristic, in accordance with the present invention by selecting the appropriate monolayers. It should be appreciated that the ability to select a given wettability within a range is advantageous when constructing an ink-jet pen.

Further, it is possible to achieve a desired wettability by combining monolayer compounds. For example, if a mixture of a polar compound such as 11-mercapto-1-undecanol and a nonpolar compound such as 1-hexadecanethiol is used, the resulting monolayer will have a contact angle in between that of the polar compound (39°) and the nonpolar compound (101°). In this example, if the ratio is high with respect to the nonpolar compound, then the contact angle will be large but less than 100°. If the ratio is low with respect to the nonpolar compound, then the contact angle will be low but greater man 39°. In essence, the ratio of the compounds used will determine the contact angle. As should be appreciated, by using a mixture of two compounds, a wetting characteristic (or contact angle) between the two compounds can be achieved. This is advantageous because a wide range of wetting characteristics can be achieved without the necessity of using a large number of compounds to accomplish similar results.

In another important aspect of the present invention, it has been found that providing a self-assembled monolayer on the inner surface 14 of the orifice plate 10 allows for better control of the firing frequency of the pen, or the "tuning" of the pen. More specifically, the use of a self-assembled monolayer on the inner surface (or firing chamber side 14) of the orifice plate has a significant effect on the frequency response of the pen, and the rate at which the firing chamber refills after an ink drop is ejected. Hence, the frequency at which an ink-jet pen can fire or eject ink can be varied or "tuned" depending on the monolayer compound utilized. Further, in this respect, the use of such monolayers on the inner surface allows a constant or steady state ink drop weight to be achieved at a specific frequency rate. Thus, the present invention provides significant flexibility in the design of ink-jet pens.

As shown in FIG. 3, the maximum frequency response at which the constant or steady state ink drop weight is observed (for a pen having a particular self-assembled monolayer on its inner surface) is quantified with the term F2ss. The steady state drop weight is the constant drop weight observed at low frequency. F2ss is obtained by extrapolating the drop weights obtained at low frequencies (steady state) to the point where it intersects the curve at the decreasing portion of the curve at higher frequencies. FIG. 3 illustrates this and is obtained by increasing the frequency at which the pen is fired while measuring the weight of the ejected drops. FIG. 3 shows the frequency response for two different monolayers, one wetting compound, $HS(CH_2)_{11}OH$, and a nonwetting compound, $HS(CH_2)_{15}CH_3$. The frequency response for some of the compounds listed in Table 1 are shown below in Table 2.

TABLE 2

| Monolayer Molecule | Compound Number | F2ss,kH$_2$ |
|---|---|---|
| HS(CH$_3$)$_{17}$CH$_3$ | 2 | 5113 |
| HS(CH$_2$)$_{15}$CH$_3$ | 3 | 5203 |
| HS(CH$_2$)$_{11}$O(CH$_2$CH$_2$O)$_3$CH$_3$ | 4 | 5672 |
| HS(CH$_2$)$_{11}$OH | 5 | 6136 |

Accordingly, a specific frequency response can be obtained by varying the monolayer in order to tune the pen to suit the particular requirements of the ink-jet printer or specifications of the print job.

In addition, and importantly, the present invention is also directed to the treatment of the orifice plate 10 with self-assembled monolayers (as identified above) to inhibit deterioration of the gold-plated surfaces. Under certain conditions, degradation or corrosion of any surface plated with gold may occur. Treating or providing a self-assembled monolayer on the gold-plated orifice plate appears to inhibit this corrosion process. To illustrate the effectiveness of the self-assembled monolayers in inhibiting corrosion in this regard, orifice sheets (one sheet has over 200 individual orifice plates) treated with self-assembled monolayers were immersed in a corrosive ink in closed containers which were placed in a 70° C. oven for 10 days. Two different sheets were treated with L-Cysteine (a wetting compound, i.e. compound 7 above), two sheets were treated with 1-hexadecanethiol (a nonwetting compound, i.e. compound 2 above), and two sheets were left untreated. The number of corrosion defects in these orifice sheets were ascertained after the tests were conducted and are shown in the following table.

TABLE 3

| Treatment | # Defects |
|---|---|
| None, sheet 1 | 5057 |
| None, sheet 2 | 1251 |
| L-Cysteine, sheet 1 | 63 |
| L-Cysteine, sheet 2 | 82 |
| 1-Hexadecanethiol, sheet 1 | 59 |
| 1-Hexadecanethiol, sheet 2 | 36 |

From these results, it should be appreciated that either a wetting or nonwetting monolayer treatment has a significant effect on inhibiting corrosion. As a result, the life of an ink-jet pen having monolayers on the surfaces of the orifice plate is significantly extended when compared to similar pens which do not have such monolayers.

In addition, the treatment of orifice plates with self-assembled monolayers as described above inhibits the contamination of the gold-plated surfaces. It is known that gold has a natural propensity to adsorb organic compounds. The propensity has been shown to affect the surfaces on orifice plates by providing a non-uniform surface for the ink, as is observed when an untreated orifice plate is dipped in ink. Part of the surface is wetting and part of the surface is nonwetting, in a random fashion. On the other hand, orifice plates which are treated with monolayers as discussed above are shown to provide a uniform surface for the ink. This is observed by a uniformly wetted or nonwetted surface when an orifice plate, treated respectively with either a wetting or nonwetting monolayer, is dipped in ink. It appears that a more uniform surface is provided by inhibiting the adsorption of contaminants on the gold-plated surface. Thus, the forces involved with ink ejection are made more uniform, thereby allowing for consistency in the ink drop weight and firing frequency, and hence, better pen performance and print quality.

While having described and illustrated the principles of the invention with reference to preferred embodiments and alternatives, it should be appreciated that the invention can be further modified in arrangement and detail without departing from such principles.

Accordingly, it is understood that the present invention includes all such modifications that may come within the scope and spirit of the following claims and equivalents thereof.

What is claimed is:

1. An ink orifice plate for an ink-jet pen, comprising:
    an inner surface and an outer surface, and an orifice extending through the plate between the inner and outer surfaces;
    the inner surface having a self-assembled monolayer thereon which will contact with ink in the pen before firing; and
    the outer surface having a self-assembled monolayer thereon.

2. The orifice plate of claim 1 wherein the self-assembled monolayer renders the inner surface nonwetting with respect to ink.

3. An ink orifice plate for an ink-jet pen, comprising:
    an inner surface and an outer surface, and an orifice extending through the plate between the inner and outer surfaces; and
    the inner surface having a self-assembled monolayer thereon which will contact with ink in the pen before firing.

4. The orifice plate of claim 3 wherein the self-assembled monolayer on the inner surface renders the inner surface nonwetting with respect to the ink.

5. The orifice plate of claim 3 wherein the outer surface has a self-assembled monolayer thereon which renders the outer surface nonwetting with respect to ink.

6. The orifice plate of claim 4 wherein the outer surface has a self-assembled monolayer thereon which renders the outer surface nonwetting with respect to ink.

7. A method of treating an ink orifice plate for an ink-jet pen, the orifice plate having an inner surface and an outer surface and an orifice extending through the plate between the inner and outer surfaces, the method comprising:
    applying a self-assembled monolayer on the outer surface; and
    applying a self-assembled monolayer on the inner surface such that the self-assembled monolayer will contact with ink in the pen before firing.

8. An ink orifice plate for an ink-jet pen, comprising:
    an inner surface and an outer surface, and an orifice extending through the plate between the inner and outer surfaces;
    the inner surface having a self-assembled monolayer thereon which will contact with ink in the pen before firing, the self-assembled monolayer formed of a compound having a terminal functional group which determines the wettability of the inner surface with respect to ink; and
    the outer surface having a self-assembled monolayer thereon formed of a compound having a terminal functional group which determines the wettability of the outer surface with respect to ink.

9. The orifice plate of claim 8 wherein the outer surface has a self-assembled monolayer thereon which renders the outer surface non-wetting with respect to ink.

10. The orifice plate of claim 8 wherein the inner surface has a self-assembled monolayer thereon which renders the inner surface non-wetting with respect to ink.

11. An ink orifice plate for an ink-jet pen, comprising:
   an inner surface and an outer surface, and an orifice extending through the plate between the inner and outer surfaces; and
   the inner surface having a self-assembled monolayer thereon which will contact with ink in the pen before firing, the self-assembled monolayer formed of a compound having a terminal functional group which determines the wettability of the inner surface with respect to ink.

12. The orifice plate of claim 11 wherein the inner surface has a self-assembled monolayer thereon which renders the inner surface non-wetting with respect to ink.

* * * * *